United States Patent [19]

McKee et al.

[11] 4,046,021

[45] Sept. 6, 1977

[54] FREE FLOATING ACTUATING LINKAGE

[75] Inventors: Kenneth E. McKee, Chicago; Alex J. McAllister, Tinley Park, both of Ill.

[73] Assignee: International Harvester Company, Chicago, Ill.

[21] Appl. No.: 715,966

[22] Filed: Aug. 19, 1976

[51] Int. Cl.[2] .......... G05G 1/14; F16H 21/44

[52] U.S. Cl. .......... 74/110; 74/512

[58] Field of Search .......... 74/503, 512, 513, 470, 74/560, 474, 478, 481, 110, 514, 579; 192/109 A; 251/291, 293; 92/129

[56] References Cited

U.S. PATENT DOCUMENTS

| | | | |
|---|---|---|---|
| 1,361,060 | 12/1970 | Houser | 74/512 |
| 2,052,737 | 9/1936 | Zubaty | 92/129 X |
| 2,670,822 | 3/1954 | Reilly | 74/513 UX |
| 2,827,800 | 3/1958 | Brelsford | 74/513 |
| 2,969,691 | 1/1961 | Cherry | 74/560 |

FOREIGN PATENT DOCUMENTS

| | | | |
|---|---|---|---|
| 1,395,021 | 5/1975 | United Kingdom | 74/560 |

*Primary Examiner*—Carlton R. Croyle
*Assistant Examiner*—Richard E. Gluck
*Attorney, Agent, or Firm*—Douglas W. Rudy; Floyd B. Harman

[57] ABSTRACT

An operating rod comprising a foot pedal assembly is carried on a first movable body and is maintained in vertical axial alignment with a control means grounded to a second movable body. The operating rod maintains operative association with the control means regardless of divergent movement between the first and the second movable body.

7 Claims, 2 Drawing Figures

FREE FLOATING ACTUATING LINKAGE

BACKGROUND OF THE INVENTION

This invention is concerned with transmitting control motion from a vibration isolated control platform for use on a vehicle to a controlled device carried on the frame structure of the vehicle. In particular a hydraulic control valve, mounted to the vehicle frame is actuated by a foot operated pedal carried on and operating through the vibration isolated floor panel of an operator's compartment of a tractor vehicle.

Current developments in agricultural tractors, earthworking machines and other material and personnel handling equipment are concerned with providing a comfortable, quiet and vibration free cab in order to reduce the environment induced fatigue to the vehicle operator. By isolating the operator from outside disturbances his full attention can be directed to the task at hand thus improving his efficiency and allowing increased fatigue free time in the field or on the job.

An area of development yielding good comfort improving results has been the isolation mounting of the operator's work station above the frame of the tractor vehicle. This has been accomplished through the use of resilient dampers, basically, elastic spacers, between the vehicle frame and the floor of the operator's work zone. Typically these dampers are engineered to reduce the transmission of vibration from the frame to the floor.

Unfortunately the transmission of vibration and its attendant noise generating property, also enters the cab or work zone through a vehicle controlled device which cannot always be of a flexible enough structure to minimize the transmission of vibrations. Prime offenders are steering shafts, brake and clutch linkages, implement control linkages and other solid connections affiliated with specific implement options.

The instant invention provides a linkage means that allows the operation of a remotely mounted operating cylinder through the use of an interrupted solid linkage. The expense and unreliability of a flexible control cable is not incurred. The subject invention allows free floating association between the operating means and the control valve means while assuming that proximate alignment is maintained at all times.

SUMMARY OF THE INVENTION

An operating rod comprising a foot pedal assembly including a shaft having a pedal pad at one end thereof and a concave cup at a second end thereof is carried in a rod guide affixed to the vibration isolated floor plate of a vehicle. A control means such as a hydraulic spool valve is mounted to a vehicle frame and is equipped with an insulator cap of a resilient material for non-fixed association with the concave cup of the operating rod. Axial motion induced in the operating rod is communicated to the control means such that operation of the control means is positive in respect to the induced motion of the operating rod. Lateral movement between the vibration isolated floor plate and the frame is not interrupted by the association of the cup and the insulator cap. Misalignment between the operating rod and the control means will not impair the operating ability between the rod and the control means.

It is an object of this invention to provide an operating device that can be used to communicate operating input motion from a first movable component to a second component regardless of moderate misalignment between the components.

Further, it is an object to minimize the transmission of vibration from the frame of a vehicle to the vibration isolated control platform of a vehicle through a valve operating control linkage.

BRIEF DESCRIPTION OF THE DRAWING

These and other objects, advantages and embodiments will be obvious from the following drawings taken in light of the following description wherein the drawings illustrate.

DETAILED DESCRIPTION OF THE INVENTION

Figure 1:
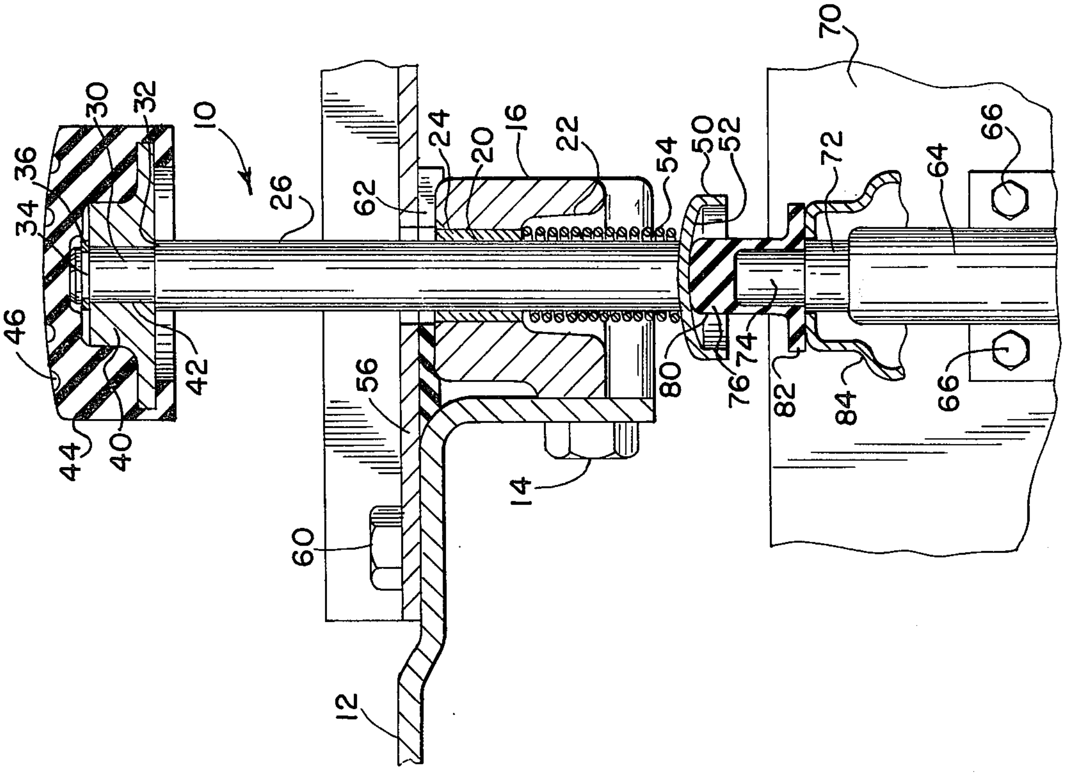
FIG. 1 is a partially sectioned view of a free floating actuating link and its association with the control means.

Looking first at FIG. 1 and one preferred embodiment, the details of the free floating actuating linkage, generally 10, are apparent. The device is mounted to a structure such as the floor portion or floor plate 12 of, for instance, an agricultural tractor by at least one fastener such as the bolt 14. The fastener 14 passes through an aperture in the floor plate 12 and into the rod guide 16 of the actuating linkage.

The rod guide 16 is equipped with a central longitudinal bore 20 opened at both ends. The bore 20 has a counterbored portion 22 with an inside diameter greater than the diameter of the bore 20. As indicated earlier there may be at least one bore perpendicular to the central longitudinal bore 20 to accommodate at least one fastening bolt 14.

A bushing 24 may be pressed or otherwise fitted into the central longitudinal bore 20 in order to provide a controlled surface. This bushing may be honed or otherwise machined to a controlled tolerance. Furthermore, the bushing is replaceable when necessary thus eliminating the need to replace the entire rod guide for want of a fresh bushing.

Carried in the bushing 24 is a rod 26 having a machined first end including a reduced diameter pedal retention portion 30 providing a shoulder 32. A radial groove 34 is provided to accept a retaining fastener 36 such as the lock ring shown. Obviously other types of retainers such as snap rings or Belleville washers could be used. A pedal assembly is maintained in the rod 26 by the retaining fasteners 36. The assembly includes pedal 40 having a central aperture 42 closely accommodating the pedal retention portion 30 and a pedal pad 44. The pedal pad 44 may be of a traction improving elastomer and may further have embossed traction grooves such as the one shown as 46.

At the second end of the rod 26 a concave cup 50 is affixed. This cup 50 may be a shallow cup having short sides and a curved interior surface 52 as shown.

A spring 54 or similar biasing means may be carried on the rod 26 between the cup 50 and the top of the counterbored recess 22. This spring 54 tends to urge the cup portion of the rod away from the rod guide 16.

An access plate 56 is installed to the floor portion 12 by means of at least one fastener such as bolt 60. A dust seal 62 is clamped between the access plate 56 and the rod guide body 16 discouraging the entry of foreign material into the rod guide 16. The dust seal may be of any elastic sealing material that will inhibit the passage of foreign material and vibrations.

The free floating actuating linkage generally 10 is used to operate a control device such as the hydraulic valve 64 which may be affixed to a portion of the vehicle not directly attached to the floor portion 12. For instance in FIG. 1 the valve 64 is bolted by fasteners 66 to a portion of the main frame 70 as shown. It is important to understand that the floor portion 12 or the attached rod 26 and rod guide 16 will be supported independently of the frame 70 and this will on occasion result in misalignment between the rod 26 and the hydraulic valve 64.

The control means or hydraulic valve 64 includes a spool portion 72 which may move into a valve body to affect the output of the valve. The spool 72 has a small diameter. portion 74 that accommodates an insulator cap 76. The insulator cap is an elastic component having a relatively thick bumper section 80 and an attached flange 82.

A boot 84 is maintained on the spool portion of the hydraulic valve by the flange 82 on the cap 76. Only a portion of the boot is seen in the figures.

As the host vehicle moves across terrain the floor portion 12 will be displaced relative to the main frame 70. The relationship between the operating pedal assembly and the hydraulic valve will be preserved to a degree allowing operative association. Thus when the need arises depressing the pedal will actuate the control valve even if they be axially misaligned a small amount. The operative relationship is apparent by looking at the drawings. The spring 54 will tend to keep the cup 50 and the cap 76 in contact even when the floor moves up and down relative to the spool valve. The edges of the cup tend to prohibit the cap from moving horizontally out of contact. Vibrations and noise will not be transmitted from the spool 72 to the cup 50 or rod 26 as vibrations will be absorbed by the bumper portion 80 of the cap 76. This is one aspect of the invention.

Figure 2:
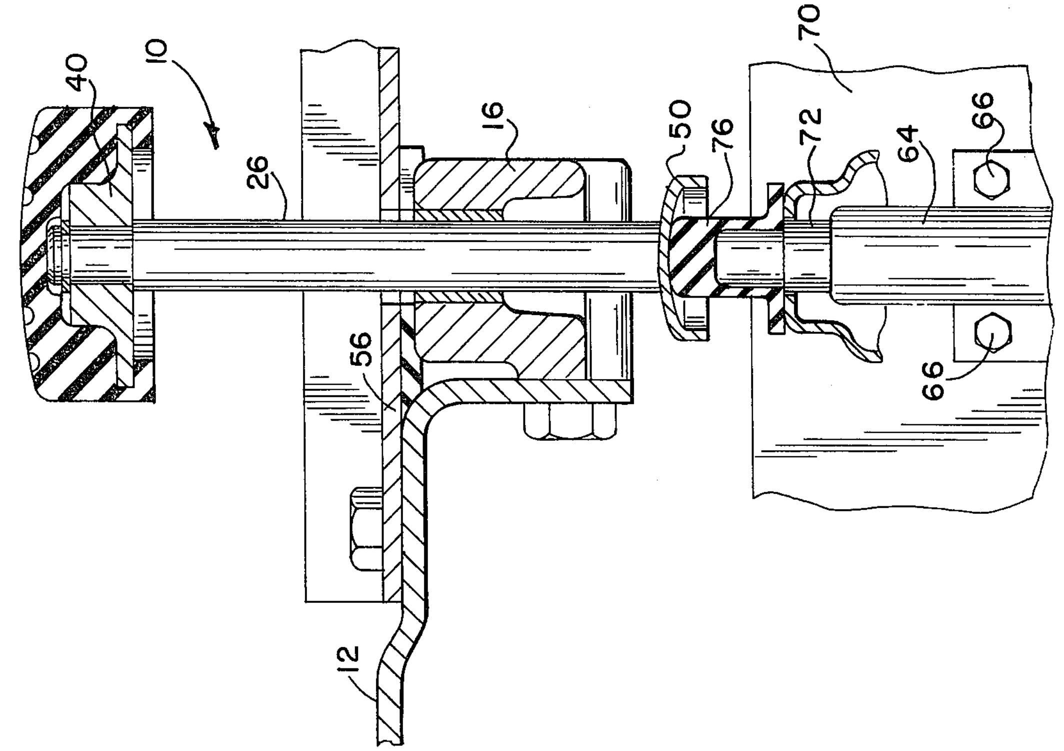
FIG. 2 is a second embodiment of the invention in a partially sectioned view.

The device shown as FIG. 2 includes most of the components shown in FIG. 1 with the exception being the spring 54. Reference characters identifying parts as shown in FIG. 1 including such components as the pedal rod 40, rod 26, rod guide 16, cup 50, insulator cap 76, and the spool portion 72 of the hydraulic valve 64.

FIG. 2 shows an alternative embodiment whereby the return spring of the hydraulic valve (not shown) or residual or active pressure in the hydraulic valve is sufficient to maintain the rod 26 in a displaced condition not affecting the output of the valve. The advantage of this embodiment is that the cost of providing the spring 54 may be conserved. In operation, FIG. 2 provides the same advantages as the FIG. 1 embodiment, namely pedal operation of a control device without transmission of vibrations from one variable component to a second component not necessarily in ideal alignment therewith.

Several other embodiments would be obvious in light of this disclosure. For instance the device could be mounted horizontally or in a deployment other than the vertical position as shown. Also, the control means shown as a hydraulic cylinder could be a mechanical operating solid rod equipped with the insulator cap 76. Various other mounting means could also be used to mount the rod guide 16, for instance it could be mounted to the access panel 56.

Thus it is apparent that there has been provided in accordance with the invention a free floating actuating linkage that fully satisfies the objects, aims and advantages set forth above. While the invention has been described in conjunction with a specific embodiment thereof it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. A motion transmitting device for communicating motion from a first body to a second body independent of the first body and minimizing the transmission of vibrations from the second body to the first body comprising:

- a rod guide having a central bore therethrough affixed to the first body;
- a rod slidably carried in the rod guide central bore having a first end equipped with a pedal and a second end equipped with a cup having a concave surface;
- a control device having a variable rod portion accommodating an insulator cap mounted to the second body thereof that is positioned in axial alignment with the rod and affords contact between the concave surface of the cup and the insulator cap whereby displacement of the rod through the central bore of the rod guide results in displacement of the movable rod portion of the control device.

2. The invention in accordance with claim 1 wherein the insulator cap of the movable rod portion of the control device comprises:

- a bumper section of elastic material being shaped with a convex surface for contacting the concave surface of the cup;
- a cylindrical body section attached to the bumper section;
- a flange portion attached to the cylindrical body section opposite the bumper section.

3. The invention in accordance with claim 1 wherein the control device is equipped with an elastic boot retained in place around the movable rod portion by the insulator cap.

4. The invention in accordance with claim 1 wherein the first body includes an access plate fastened to the first body and overlying the rod guides, a dust seal between the access plate and the rod guides whereby foreign material and vibrations are restricted from passing between the access plate and the rod guide.

5. A motion transmitting device for communicating motion from a first body to a second body independent of the first body and minimizing the transmission of vibrations from the second body to the first body comprising a rod guide having a central bore therethrough affixed to the first body;

- a rod slidably carried in the rod guide central bore having a first end equipped with a pedal and a second end equipped with a cup having a concave surface;
- a spring carried on the rod between the cup and the central bore of the rod guide for urging the rod away from the rod guide;
- a control device having a movable rod portion accommodating an insulator cap mounted to the second body thereon that is positioned in axial alignment with the rod and affords contact between the concave surface of the cup and the insulator cap whereby displacement of the rod through the central bore of the rod guide results in displacement of the movable rod portion of the control device.

6. The invention in accordance with claim 5 wherein the insulator cap of the movable rod portion of the control device comprises:

a bumper section of elastic material being shaped with a convex surface for contacting the concave surface of the cup;

a cylindrical body section attached to the bumper section;

a flange portion attached to the cylindrical body section opposite the bumper section.

7. The invention in accordance with claim 5 wherein the first body includes an access plate fastened to the first body and overlying the rod guides, a dust seal between the access plate and the rod guide whereby foreign material and vibrations are restricted from passing between the access plate and the rod guide.

* * * * *